INVENTOR
DANIEL WALMSLEY COOPER
BY
ATTORNEY

United States Patent Office
3,196,693
Patented July 27, 1965

3,196,693
DELAYED RELEASE LOCKING DEVICE
Daniel Waumsley Cooper, Woking, Surrey, England,
assignor to G.Q. Parachute Company Limited, Woking,
Surrey, England, a British joint-stock company
Filed Apr. 30, 1962, Ser. No. 191,103
Claims priority, application Great Britain, May 4, 1961,
16,248/61
5 Claims. (Cl. 74—3.54)

This invention is for improvements in or relating to a delayed release locking device.

A particular use for the invention is in connection with the dropping of loads by parachute. When dropping such loads it is often necessary, when some form of stabilization has been reached, to release a control or to jettison an object, for example, a drogue sock might be released to allow a parachute to deploy, a de-reefing line might be released to allow all the canopy to become effective, or a ballast load used to ensure full deployment of a parachute when a light load is being dropped might be jettisoned.

An object of this invention is to provide a single unit which connects the load, the supporting means such as the parachute and the object or control to be released, referred to later as an attachment.

A delayed release locking device according to the invention has means at one end for attaching a load, means at the other end for attaching a supporting means for the load and locking means for holding an attachment or attachments, in which a timing mechanism (for example, a clock mechanism) is held immobilised until a predetermined strain developed between the two ends of the device trips the timing mechansm which after a desired period of delay has expired, ensures that the said tripping opens the said locking means to release the said attachment or attachments.

According to another aspect of the invention, a delayed release device comprises in combination at least two members moving one within the other in relatively opposite directions, means mounted within the inner member operable to hold said members against relative movement in opposite directions and operable a predeterminable time after a predetermined strain has been applied to the device to permit a limited and relative movement of the said members in opposite directions to release an attachment or attachments held by locking means formed or controlled by the said members. The strain can be caused by the reaction between the load and the supporting means and/or the attachment or between the supporting means and the load and/or the attachment.

Further, according to the present invention there is provided a delayed release locking device which includes a timing mechanism mounted for movement within a first housing, a second housing enclosing at least a part of said first housing, and mounted for movement relative to said first housing, detent means effective to prevent operation of the timing mechanism until said mechanism has been moved within said first housing to initiate working of the timing mechanism, and detent means operable, under the control of said timing mechanism, to inhibit relative movement between said first and second housings, the locking means being formed from parts of said first and second housings which hold an attachment or attachments pending release of said locking means.

Again according to the present invention there is provided a delayed release locking device which includes a timing mechanism and a housing, locking means for holding an attachment or attachments formed from parts of said mechanism and said housing, spring-urged detent means mounted upon said housing and normally engaging with said timing mechanism to inhibit relative movement between said mechanism and said housing, a plunger movable between said mechanism and said housing, said plunger movable in a direction along the longitudinal axis thereof into engagement with said detent means to lock said detent means in engagement with the timing mechanism, said plunger being retractable under the control of said timing mechanism out of engagement with said detent means to permit said detent means to disengage said timing mechanism under load and against said spring influence and thereby to condition said mechanism and said housing for relative movement to unlock said locking means and release said attachment or attachments.

Preferably, the locking means referred to in the preceding paragraphs consists of apertures formed in the housing and radially alinged with axially disposed lugs formed on the housing provided for the timing mechanism.

The present invention includes a plurality of lugs and a plurality of apertures radially aligned with said lugs, relative movement between said lugs and said apertures in one direction serving to close the locking means constituted by said apertures and lugs and in the opposite direction serving to open said locking means. Preferably, the lugs are formed on a first housing which encloses the timing mechanism and the apertures are formed in a second housing which encloses at least a part of said first housing.

Preferably, also, the means operable under the control of the timing mechanism to permit immobilisation of the applied locking means includes both a pair of detent lugs which are adapted to extend through an aperture formed in the timing mechanism and a plunger, the arrangement being such that the plunger is movable into engagement with the detent lugs whereby to inhibit relative movement in one direction between the timing mechanism and the second housing and is retractable out of engagement with the detent lugs whereby to permit relative movement in said one direction between the timing mechanism and the second housing.

Relative movement between recited parts (namely, between the first and second housings, between the timing mechanism and the housing provided therefor, between the lugs and the aperture) is preferably movement in a direction along the longitudinal axis of the device.

Movement of the plunger towards and away from the detent lugs is also axial and is controlled by the timing mechanism.

The invention will be hereinafter more particularly described with reference to the accompanying drawings in which.

Figure 1:
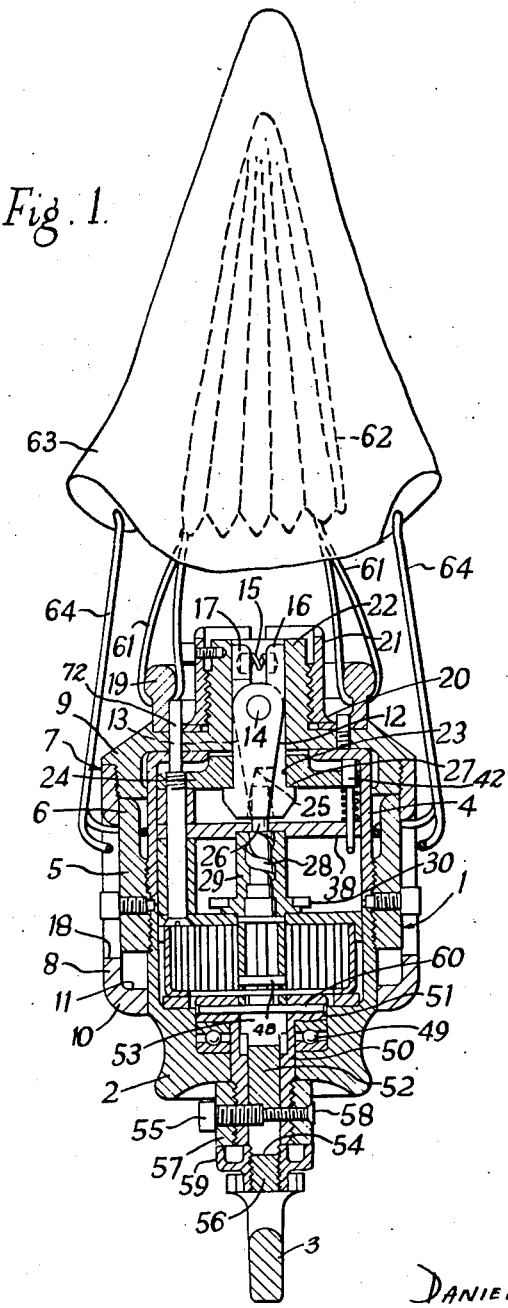
FIGURE 1 illustrates in axial section a delayed release locking device constructed in accordance with the present invention.
Figure 2:
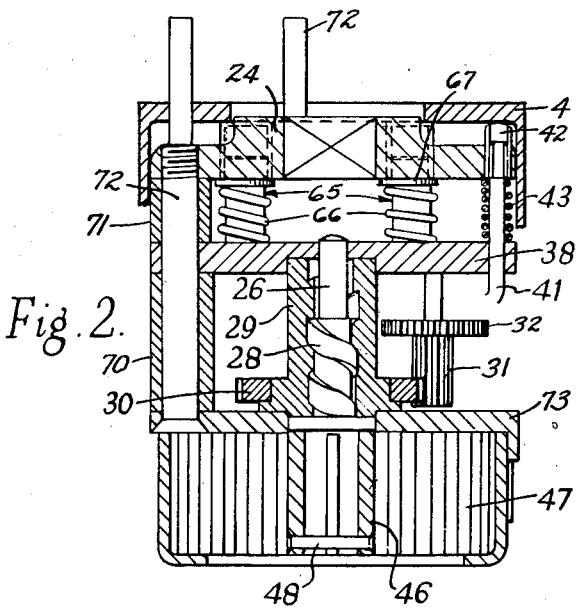
FIGURE 2 illustrates in axial section the timing mechanism employed in said device.

To enable the operation to be more clearly shown, parts of the timing mechanism, such as the gear train and the springs to prevent premature release are not shown in FIGURE 1. These parts are shown in FIG. 2.

Referring to the drawings, the device comprises a first housing indicated generally at 1 which is arranged to slide within a second housing 7 and a timing mechanism which is arranged to slide within the first housing 1.

The first housing 1 is formed in three main parts, namely, a first part 2 which carries a swivel eye 3, a second part 4 which is cup-shaped and thirdly an annular toothed union 5. Both the first and second parts 2 and 4 are exteriorly screw-threaded and the annular toothed union 5 is internally screw-threaded and said internal screw-thread and the external screw-threads on the parts 2 and 4 cooperate to ensure that the said two parts 2 and 4 are not movable relatively to the timing mechanism when the various parts have been assembled as illustrated in FIGURE 1.

The annular toothed union 5 consists of a ring from one face of which there projects in an axial direction a plurality of lugs 6 co-axial with the toothed union 5.

The first housing 1 is mounted for axial movement within a second housing 7 which surrounds a portion (in an axial direction) of the first housing 1 in such a manner that the swivel eye 3 extends downwardly beyond the lowermost part (as seen in FIGURE 1) of the second housing 7. The second housing 7 is formed in two main portions, one being an annular sleeve 8 which encircles the annular toothed union 5 and the other being a sleeve head 9, the sleeve 8 being internally screw-threaded and the head 9 being externally screw-threaded for engagement with one another as illustrated. The annular sleeve 8 has the end thereof remote from the head 9 turned inwardly to form a rim 10 which is in contact with the lower end of the first housing part 2 and provides a clearance 11 between the first housing 1 and the sleeve 8 to permit axial movement, as hereafter described, of the annular toothed union 5.

Two detent lugs 12, 13 are pivotally mounted upon a shaft 14 carried by the sleeve head 9 and a spring 15 is disposed between a pair of lugs 16, 17 integral with the lugs 12, 13 respectively, for a purpose which will be hereinafter described.

The sleeve 8 is provided with a plurality of apertures 18 equal in number to the number of lugs 6 formed on the annular toothed union 5 and said apertures 18 and lugs 6 are in radial alignment with one another so as to comprise an attachment or holding means. Further, a rigging line ring 19 is mounted upon the sleeve head 9 and is held in position by the flanged portions 20 of an internally threaded sleeve 21, the screw-thread of which engages with an external screw-thread formed in the cylindrical outer surface of a boss or extension 22 which is integral with the sleeve head 9. It will be appreciated that the main portion of each of the detent lugs 12, 13 is housed within the bore of the extension 22 and that the shaft 14 has its ends journalled in said extension 22. The detent lugs 12, 13 each extend through a square hole 23 formed in a cap 24 which closes the timing mechanism compartment, the thickness of the lugs 12, 13 being such that they are incapable of movement relatively to one another in one direction in said hole but are, of course, capable of relative movement about their common pivotal axis in the other direction in said hole. Each lugs 12, 13 is provided with a cut-away portion 25, the two portions 25 being so disposed that, together, they constitute a square hole into which a square spigot 26 can be caused to extend, as hereafter described. Each lug 12, 13 is also formed with a step 27, said steps 27 hooking under the cap 24 as shown and thereby constituting a securing or detent means.

Referring now to the timing mechanism, the square spigot 26 is carried upon one end of a threaded shaft 28 (FIGURES 1 and 2) which is arranged for rotation about its axis within a nut 29 which is formed integrally with or is keyed to a gear wheel 30. The teeth of the gear wheel 30 mesh with the teeth of a pinion 31 which is coaxial with and secured to a gear wheel 32. Said pinion 31 and gear wheel 32 form one end of a gear train which consists of or includes further gear wheels 34, 36 and pinion 33, 35. An escapement pallet 37 (of, for example, anchor or Graham construction) engages the teeth of the gear wheel 36.

The pallet 37 oscillates under pressure of the rotating teeth on its associated gear wheel 36, the latter being urged to rotate under the force exerted by the spring 47, referred to hereinafter, through the train of gears. As the pallet 37 oscillates it releases gear wheel 36 tooth by tooth to provide a time delay. The part 37 is carried by shafts 69 on which is mounted an inertia collar 68. This collar regulates the time of oscillation of the pallet 37. The rate of oscillation, and so the time delay of the mechanism, can be varied by altering the weight of this inertia collar. The time delay can also be varied by changing the length of the spigot 26 or the pitch of the thread of the shaft 28 and the nut 29.

The spindles carrying the gear wheels 32, 34, and 36, and the pallet 37, run in bearings in plates 38 and 73. The timing mechanism is held together by three screws 72 which pass through holes in the plates 73 and 38 and through holes such as 74 in the crescent shaped distance pieces 70, 71 and screw into threaded holes in the cover plate 24. The screws have extensions which pass through holes in the housings 2 and 7 to prevent rotation of the timing mechanism relative to the housings.

Four studs 65, two of which are shown in FIG. 2, are carried by a plate 38 and pass through holes, not shown, in plate 24. The studs carry springs 66, which prevent premature release of the mechanism, and caps 67, the rims of which are shown in FIG. 2, which pass through the holes in the plate 24 and press against the end of part 4 of the housing 1. The springs 66 are varied to suit the safe handling load below which the mechanism will not operate.

Figure 3:
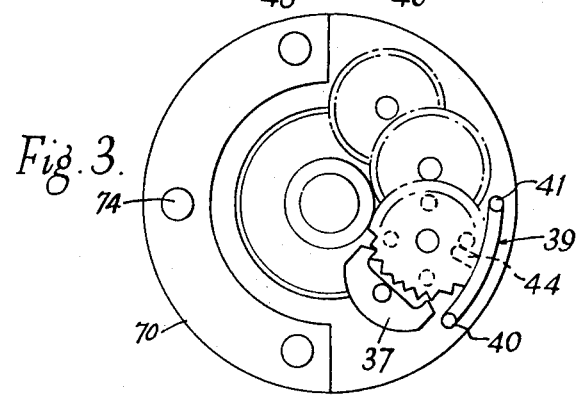
FIGURE 3 is a fragmentary plan view of the timing mechanism.

A detent consists of a U-shaped element 39, FIG. 3, having its two limbs 40, 41 extending through the cap 24 and the plate 38 and each limb is provided with a top-piece 42. A spring 43 is interposed between the shoulder formed by the top-piece 42 and the plate 38. The cross-piece of the U-shaped element 39 carries an arm 44 which has a small projection thereon which is as hereinafter explained, engages one of four projections 45 formed on the underside of the gearwheel 36.

Figure 4:
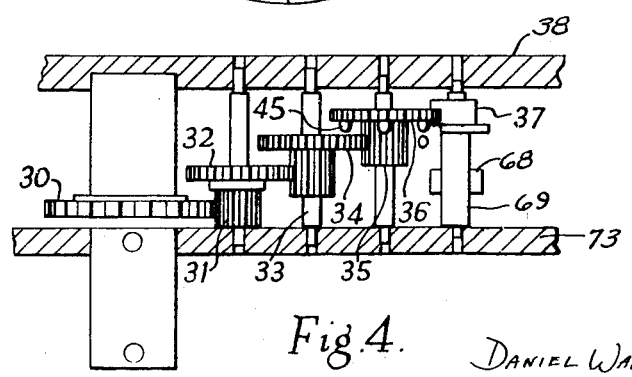
FIGURE 4 is a development, in line, of the gear train of the timing mechanism.

It will be appreciated that only one limb of the element 39 has been illustrated in FIGURE 2 for clarity and ease of understanding of the drawing, and also that the element 39 has been omitted in FIGURE 4 for the same purpose.

The timing mechanism also includes a barrel 46 which is integral with or secured to the nut 29 and to which is connected one end of a coiled spring 47. A pin 48 extends across the bore of the barrel 46.

Referring now to the swivel eye 3, this includes a ball race 49, a tubular member 50 which is exteriorly screw-threaded over a portion of its axial length and which is radially outwardly flanged at 51. A key 52 extends through the bore of the member 50, said key having two parallel limbs 53 (only one visible in FIGURE 1) at the inner end thereof, having a guide slot 54 formed therein, having a notch cut therein into which one end of a screw 55 extends in FIGURE 1, and having a screw-threaded outer end 56. A nut 57, integral with the swivel eye 3, is interiorly threaded and engages the screw-thread formed on the tubular member 50 and said nut 57, swivel 3 and member 50 are additionally keyed to one another by a screw 58 the shank of which projects into the slot 54. A nut 59 is interiorly threaded and engages the screw-thread formed on the outer end 56 of the key 52.

Lastly, a pin 60, circular in section, extends across the bore of the member 50 at the axially inner end thereof, the end portions of said pin 60 being located in diametrically opposed holes formed in the flange 51 of said member 50.

The operation of the delayed-release locking device will now be described, and for this purpose the rigging line ring 19 has been illustrated as engaging rigging lines 61 of a stabilizer parachute 62 which is enclosed within a drogue sock 63 which has loop tapes 64 trapped between parts of the first housing 1 and second housing 7. The tongues 6 project beyond the tops of the apertures 18 to hold the loop tapes 64 safely in position. It is, therefore, assumed that the clock mechanism has been wound and is in a condition to be tripped to control a delayed-release.

The swivel eye 3 is free to rotate about the longitudinal axis of the device by virtue of the ball race 49, and relative axial movement between the key 52 and the nut 59 is inhibited by the shank of the screw 55 engaging the notch formed in said key 52.

When, for example, a pilot is ejected from an aircraft or other vehicle travelling at high speed, it is necessary or at least desirable for his speed to be reduced, and the drogue sock 63 is provided with flaps or other devices which partially achieve this object. However, it will be apparent that the drag exerted on the person by the drogue sock 63 causes a load to be applied to the swivel eye 3 which is secured to the airman's harness, and this applied load causes the first housing 1 to move through a small distance relatively to the second housing 7. The cap 24 of the timing mechanism unit is also moved by this movement towards the top part 4 of the housing 1. The cap 42 of the detent 39 is normally resting against the underside of top part 4. The relative movement of the two housings depresses the cap 42 and thereby detent 39, arm 44 is then withdrawn from engagement with pins 45 on the gear wheel 36, thus allowing the clock mechanism to operate. Thus this small initial relative movement of the housings 1 and 7 causes the spring biased detent 44 in the clock mechanism to release the gear train of the said clock mechanism. The clock then unwinds under the influence of the power stored in the coil spring thereof. The time taken for the complete unwinding of the clock can be regulated as stated above. It may, for example, be arranged to take three seconds. In unwinding, the power stored in the spring 47 rotates the nut 29 and retracts the spigot 26. The detent lugs 12 and 13 are thus free to swing about shaft 14 and as there is an offset between shaft 14 and the surfaces of steps 27, the detent lugs 12, 13 are collapsed (each moves radially inwardly) under load and against the influence of the spring 15 and such collapsing causes the steps 27 on the lugs 12, 13 to disengage the cap 24. At this juncture, the first housing 1 and the second housing 7 are free for further axial movement relative to one another and are so moved by the applied load until the union 5 is stopped by the rim 10 on sleeve 8. Such relative axial movement causes the locking means which consists of the apertures 18 in the sleeve 8 and the lugs 6 on the toothed union 5 to be opened because, when the lowermost portion (as seen in FIGURE 1) of the toothed union 5 abuts the upper surface of the rim 10, the tips of the lugs 6 will be clear of the tops of the apertures 18. Thereupon, the loop tapes 64 of the drogue sock 63 fly out and the drogue sock is carried away by the air pressure so that the stabiliser parachute is deployed to reduce further the speed of descent of the parachutist to a value which will enable him to safely open his main parachute. When the drogue sock encloses the stabilizer parachute as illustrated in FIG. 1, the drogue sock prevents the stabilizer parachute from fully opening.

When it is desired to reset a device which has been operated as described, a stabiliser parachute and drogue sock are fitted as illustrated in FIGURE 1, the loop tapes of the drogue sock being engaged by the lugs 6 by causing relative axial displacement of the housings 1 and 7. Thereafter, the screw 55 is rotated to withdraw its free end from the notch formed in the shank of the key 52 because, when the screw 55 engages said notch, the key 52 cannot be moved in an axial direction or be rotated. With the key 52 free to move, the nut 59 is rotated to cause axial movement of the key 52 towards the coil spring 47 and the key 52 is caused to move in that direction until the limbs 53 are disposed on each side of the pins 48 and 60. When these two pins 48, 60 are thus bridged by and lie between said limbs 53, the clock mechanism can be wound by turning the swivel eye 3 and the integral nut 57 to store power in the spring 47. Once the pins 48, 60 are bridged, the whole clock mechanism is moved axially in order to depress the element 39 against the springs 43 to free the gear train 30 to 36. Continued rotation of the swivel eye 3 and integral nut 57 will cause rotation of the nut 29, thereby moving the spigot 26 upwardly in order to lock the lugs 12, 13 apart, namely, in the position illustrated in FIGURE 1. The spring 47 is prevented from unwinding by the detent 39 as the key 52 is retracted by rotating nut 59.

Pin 48 is a cross bar for the key 53 to register with as the key 53 is raised by the nut 59 into the winding position while pin 60 ensures that the winding torque is not transmitted from key 53 onto the screws 55 and 58 and so cause damage to the threads.

The device has three points in which the loads are applied, namely, the swivel eye 3, the ring 19 and the lugs 6. The device can therefore be used for dropping part only of a load, and is useful if a light load is to be dropped. In the past, when dropping a light load there has been difficulty in arranging for the parachute to deploy fully. With the device of the present invention, a ballast load can be connected to the lugs 6, the light load to the eye 3, and the parachute to the ring 19. When the parachute is fully deployed, the mechanism operates to move the lugs clear of the apertures 18. The ballast load is dropped, and the parachute carries the light load safely to ground.

The device can also be used, for example, as a mechanical de-reefer, the parachute reefing cords being held by the lugs 6 which will de-reef the canopy a predetermined time after the load has been taken by the canopy.

The swivel eye 3 and the ring 19 can be replaced by any kind of attachment means and the first housing can carry a ring such as 19 instead of the swivel eye 3, and the second housing can carry a swivel eye such as 3 instead of the ring 19, or both housings can carry either rings or eyes if desired.

What I claim as my invention and desire to secure by letters patent of the United States is:

1. A delayed release locking device comprising a first member for supporting a load, a second member for attachment to a support, the first and second members each comprising a hollow housing, one telescopically slidable within the other, releasable attachment means comprising spaced lugs on one of said housings extending over apertures formed in the other housing for holding an attachment operatively connected to said members and operated to a released position by relative movement between said members, first detent means releasably holding said members together in a holding position, timing means located within one of the housings and operatively connected to said first detent means, a second detent means operatively connected to said timing means so as to prevent operation thereof, the second detent means being operatively connected to said members so as to be moved by limited relative movement between said members so as to permit operation of said timing means, said timing means operating said first detent means to a released position after a predetermined time so that the load and attachment may move said members relative to each other and cause said attachment means to be operated to a released position whereby the support assumes the load.

2. The device as defined in claim 1, wherein said timing means comprises a plunger, a spring operated clock mechanism connected to said plunger so as to move the plunger after a predetermined time, said first detent means including at least one latch pivotally connected to one of said housings and having latch means for latching the other housing to said one housing, spring means urging said latch to an engaged position, the plunger engaging the latch to hold it in latching position, said clock mechanism moving said plunger after said predetermined time out of engagement with said latch so as to permit the load to pivot it to a position releasing said other housing.

3. A device as defined in claim 1, including a stabilizing parachute comprising said support and connected to said second member.

4. A device as defined in claim 3, including a drogue sock comprising said attachment and releasably connected to said attachment means.

5. A delayed release locking device having a longitudinal axis comprising a timing housing and a timing mechanism enclosed in said timing housing, an inner housing enclosing said timing housing and said timing housing being axially movable a limited distance within said inner housing, an outer housing enclosing and slidably receiving said inner housing for axial movement therein, means limiting relative axial movement between said inner and outer housings, said inner and outer housings including attachment means for attaching an attachment thereto and operable by relative movement between said housings, first detent means on said outer housing engageable with said timing housing so as to prevent relative axial movement between said timing housing and said outer housing and so as to limit relative axial movement between said inner housing and outer housing, second detent means on said timing housing normally preventing operation of said timing means, support means on said inner housing for moving it axially so as to operate said second detent means to a released position whereby said timing mechanism operates said first detent means to a released position and said support means further axially moves said inner housing to move said attachment means to a released position.

References Cited by the Examiner
UNITED STATES PATENTS 2,616,748   11/52   Hight _____ 244—150
2,665,163   1/54    Gross _____ 244—150

FOREIGN PATENTS 278,695     4/28    Great Britain.
609,000     9/48    Great Britain.
1,208,932   2/60    France.

BROUGHTON G. DURHAM, *Primary Examiner.*

DON A. WAITE, *Examiner.*